July 18, 1933.  G. H. HUFFERD ET AL  1,918,395
BALL JOINT
Filed Oct. 26, 1928
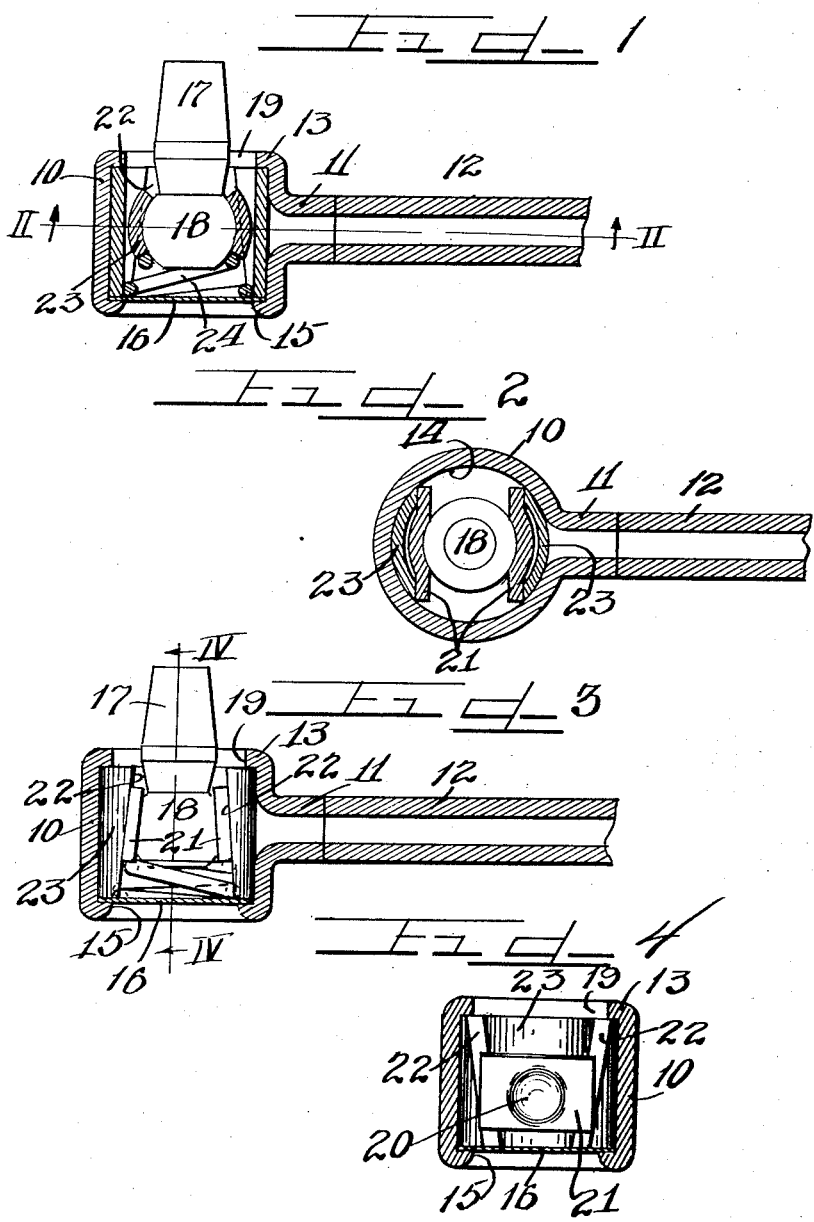

Patented July 18, 1933

1,918,395

UNITED STATES PATENT OFFICE

GEORGE H. HUFFERD AND MATTHEW P. GRAHAM, OF DETROIT, MICHIGAN, ASSIGNORS TO THOMPSON PRODUCTS, INC., OF CLEVELAND, OHIO, A CORPORATION OF OHIO

BALL JOINT

Application filed October 26, 1928. Serial No. 315,209.

This invention relates to an improved self adjusting ball joint and has special reference to joints suitable for the tie rods and drag links of the steering linkage of automotive vehicles, shock absorber links and the like.

The general object of this invention is to provide an inexpensively manufactured ball joint which will be self adjusting to compensate for wear without altering the center distance or length of the tie rods.

It is also an object of this invention to provide a ball joint of the class described the parts for which can be constructed from stamped sheet metal without weakening or otherwise detracting from the serviceability and durability of the complete tie rod.

It is another object of this invention to provide an indian pipe type of ball joint having a minimum end clearance wherein renewing a renewable ball seat members are vertically slidable on renewable inclined surfaces adapted to maintain the seat members in close contact with the ball, the tie rod in effect hanging from the ball and being held in its lowermost position by a spring adapted to both assist in the adjusting movement and to hold the tie rod against rattling on the ball.

Other and further important objects of this invention will be apparent from the disclosures in the specification and accompanying drawing.

The invention (in a preferred form) is illustrated on the drawing and hereinafter more fully described.

On the drawing:

Figure 1 is a vertical longitudinal section through a ball joint embodying the features of this invention.

Figure 2 is a section on the line II—II of Figure 1.

Figure 3 is a section similar to Figure 1 wherein the ball seats and ball are shown in elevation.

Figure 4 is a vertical section on the line IV—IV of Figure 3.

As shown on the drawing:

A cylindrical ball joint housing 10 is shown with an extension 11 at right angles to the side of the housing, this extension being welded to the end of a tie rod intermediate section 12. The housing proper is preferably drawn and worked into shape from a tube stock and is provided with an inturned upper flange 13 forming a shoulder at the top of a cylindrical bore 14. The bottom 15 of the bore is initially formed in alignment with the bore 14 and is later spun over a closure disc 16 to retain the parts in place in the bore, as shown in Figures 1 and 3.

A ball stud 17 carries a ball 18 on its end which passes through the central opening 19 in the flange 13 and is seated in spherical bearing surfaces 20 stamped in plates 21 which ride on the inclined edges 22 of segmental shells 23 fitting the cylindrical bore 14. The plates 21 and shells 23 may both be economically stamped from sheet metal. The segmental shells have thin edges formed in a plane inclined with respect to the axis of the curved outing surface of the shells, thus forming oppositely disposed wedges which converge towards the top so that the weight of the tie rod, supplemented by the action of a coil spring 24 disposed between the lower part of the ball 18 and the disc 16, serves to push the ball and ball seat plates 21 upwardly into the wedge shaped space between the edges 22 of the two shells 23. The spring 24 also serves to prevent loosening of the bearing due to road shocks and the like.

It will thus be seen that we have produced an improved and simplified ball joint that will be self adjusting and durable in service while being capable of manufacture in quantities at comparatively small cost due to the simplicity of the forming operations required for the production of the major parts.

We are aware that numerous details of construction may be varied through a wide range without departing from the principles of this invention, and we therefore do not purpose limiting the patent granted, otherwise than necessitated by the prior art.

We claim as our invention:

1. A ball joint connection comprising a ball stud, a housing for the ball end thereof, said housing having a cylindrical bore with an inturned radial flange at the top thereof, wedge like segmental shells of sheet metal fitting within the cylindrical bore, and having edges defining oppositely disposed inclined surfaces relative to the cylinder axis, ball seat members of sheet metal having spherical ball seat bearings formed therein to partially envelop the ball end, said members having extensions adapted to engage and slide upon the inclined surfaces of said shells.

2. A ball joint connection comprising a ball stud, a housing for the ball end thereof, said housing having a cylindrical bore with an inturned radial flange at the top thereof, wedge like segmental shells of sheet metal fitting within the cylindrical bore, and having edges defining oppositely disposed inclined surfaces relative to the cylinder axis, the big ends of said shells bearing against the radial flange, and ball seat members of sheet metal having spherical ball seat bearings formed therein to partially envelop the ball end, said members having extensions adapted to engage and slide upon the inclined surfaces of said shells, and means for urging the ball and ball seat members towards the big ends of the segmental shells whereby to take up looseness in the ball joint.

3. A ball joint connection comprising a ball stud, a housing for the ball end thereof, members fixedly positioned within said housing and having oppositely inclined flat surfaces, separate ball seats having segmental spherical bearing surfaces for receiving said ball and having extensions thereof adapted to engage and slide upon the inclined surfaces of said members, and means urging said ball seat members into closer bearing engagement with said ball and the inclined flat surfaces of said members.

GEORGE H. HUFFERD.
MATTHEW P. GRAHAM.